United States Patent [19]
Moritz

[11] Patent Number: 5,860,768
[45] Date of Patent: Jan. 19, 1999

[54] SYSTEM FOR TRANSMITTING ELECTRICAL ENERGY HAVING AT LEAST ONE UNDERGROUND, HIGH-VOLTAGE ELECTRICAL CONDUCTOR, AND A METHOD FOR PRODUCING SUCH A SYSTEM

[75] Inventor: Bertil Moritz, Västeras, Sweden

[73] Assignee: Asea Brown Boveri AG, Baden, Switzerland

[21] Appl. No.: 716,562

[22] Filed: Sep. 18, 1996

[30] Foreign Application Priority Data

Nov. 15, 1995 [DE] Germany ............ 195 42 595.2

[51] Int. Cl.⁶ ........................................ F16L 1/00
[52] U.S. Cl. ............... 405/154; 174/24; 174/28; 405/184
[58] Field of Search ............... 405/154, 184, 405/155, 156, 157; 174/27, 28, 37

[56] References Cited

U.S. PATENT DOCUMENTS

| | | | |
|---|---|---|---|
| 4,162,865 | 7/1979 | Aubet | 405/154 |
| 4,354,774 | 10/1982 | Bianchi et al. | 405/154 X |
| 4,688,890 | 8/1987 | DeMeo et al. | 405/154 X |
| 4,744,695 | 5/1988 | Lindsey et al. | 405/154 |
| 4,963,420 | 10/1990 | Jarrin et al. | 174/28 X |
| 5,087,153 | 2/1992 | Washburn | 405/154 |
| 5,571,989 | 11/1996 | Thuries et al. | 174/28 X |
| 5,571,990 | 11/1996 | Pham et al. | 174/28 X |
| 5,742,001 | 4/1998 | Thuyries | 174/28 X |

FOREIGN PATENT DOCUMENTS

| | | |
|---|---|---|
| 8026466 | 1/1981 | Germany . |
| 1124081 | 8/1968 | United Kingdom . |

OTHER PUBLICATIONS

"Flexible Gas–Insulated Cable for 230 kV, 345 kV and 500 kV", Miller, et al., IEEE Transactions on Power Apparatus and Systems, vol. PAS–103, No. 9, Sep. 1984.

"Cooling Underground E.H.V. Cables", Hitchcock, et al., Electrical Review, Dec. 24, 1965, pp. 946–950.

Primary Examiner—Dennis L. Taylor
Attorney, Agent, or Firm—Burns, Doane, Swecker & Mathis, L.L.P.

[57] ABSTRACT

The system serves to transmit electrical energy in conurbations. It has a gas-insulated cable (1) having at least one high-voltage electrical conductor (8) arranged in a pipe (101) filled with insulating gas. The gas-insulated cable (1) contains at least two underground cable sections (11, 12), which can be operationally interconnected at an installation point (5) accessible from the outside. Such a system is distinguished by high availability, is easy to maintain and can be produced in a method in which impairment of the infrastructure of the conurbation accommodating the system is largely prevented.

9 Claims, 3 Drawing Sheets

SYSTEM FOR TRANSMITTING ELECTRICAL ENERGY HAVING AT LEAST ONE UNDERGROUND, HIGH-VOLTAGE ELECTRICAL CONDUCTOR, AND A METHOD FOR PRODUCING SUCH A SYSTEM

BACKGROUND OF THE INVENTION

1. Field of the Invention

The invention is based on a system for transmitting electrical energy having at least one underground, high-voltage electrical conductor according to the preamble of patent claim 1. The invention also relates to a method for producing such a system.

2. Discussion of Background

Such a system is preferably used in conurbations, and usually contains high-voltage cables which are laid in the ground and conduct electrical energy from power stations, overhead lines or transforming stations to substations in which high voltage of, for example, 110 kV is transformed to medium voltage of, for example, 10, 20 or 30 kV. In rapidly growing urban agglomerations, in particular in Asia, such a system cannot be set up or extended without substantial impairment of elements of the infrastructure, such as the traffic, supply of water and gas and the disposal of sewage. This is so chiefly because it is generally necessary when laying and maintaining high-voltage cables to dig trenches, and this very severely disturbs the infrastructure and substantially impairs its efficiency.

SUMMARY OF THE INVENTION

Accordingly, one object of the invention as it is specified in Patent claims 1 and 11 is to provide a novel system of the type mentioned at the beginning which is distinguished by a high availability, is easy to maintain and at the same time can be produced using a method which when carried out at most slightly impairs the infrastructure of a conurbation accommodating the system.

The system according to the invention is distinguished in that complicated and vulnerable cable connections are eliminated, and that only very slight reactive-power losses occur. In addition, the individual cable sections can be cooled particularly effectively, and so an extremely high current carrying capacity can be achieved. Since the system is generally laid several meters below the surface of the earth, electromagnetic interference fields scarcely penetrate to the outside, and the system is moreover largely protected against acts of vandalism.

It is particularly advantageous that the system can be produced in a method in which disturbance of the infrastructure already present is largely avoided. The tearing up and displacement of traffic arteries, the interruption of already existing pipelines and cabling, and the excavation of cable trenches and cable shafts are eliminated virtually completely. Moreover, it is possible, as the case may be, for the system according to the invention to be produced in a single process and, at the same time, for further components of the infrastructure, such as sewage pipes, to be produced as well.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
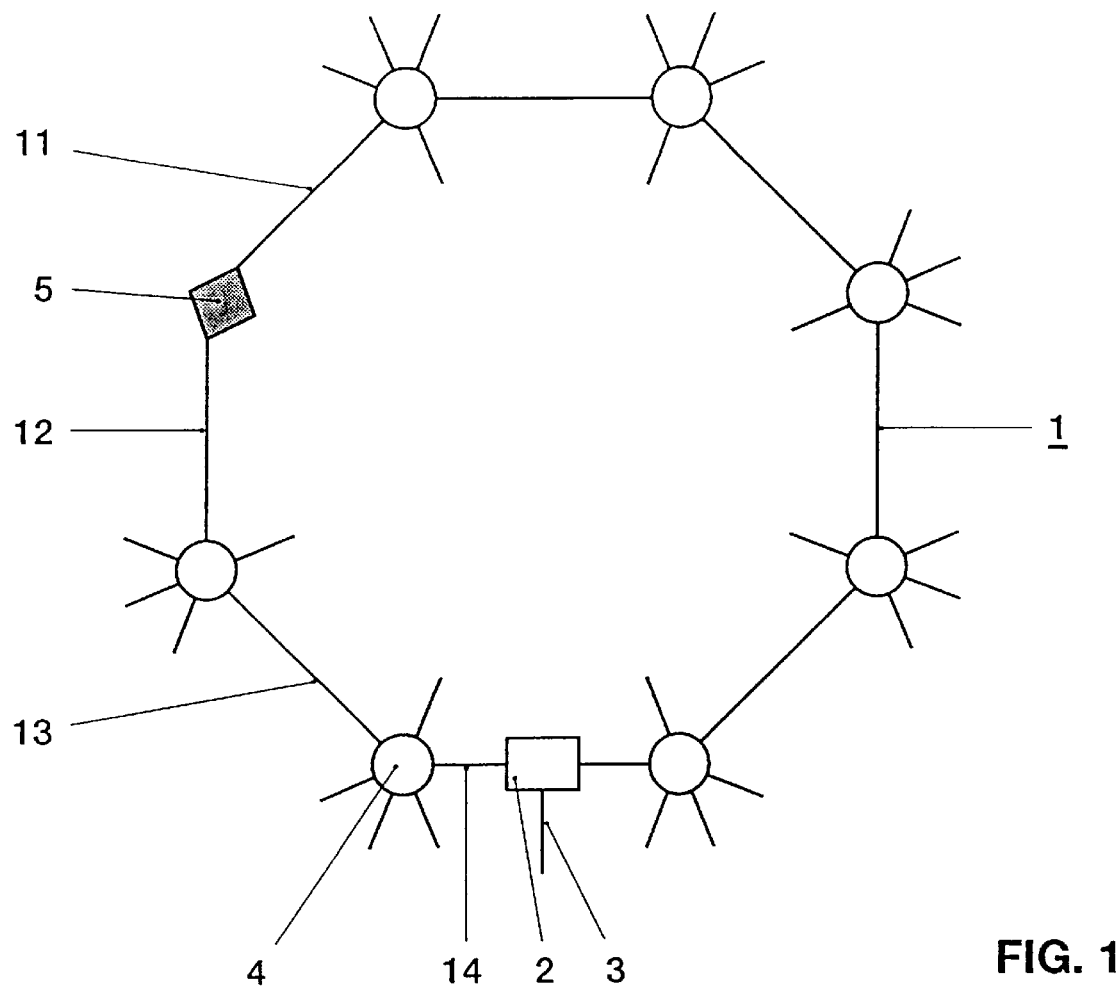
FIG. 1 shows a block diagram of an embodiment, designed as a ring, of a system according to the invention having an underground gas-insulated cable and substations having installation points.

Referring now to the drawings, wherein like reference numerals designate identical or corresponding parts throughout the several views, the system according to the invention shown in FIG. 1, which is designed as a ring, has an underground gas-insulated cable 1. In a substation 2 of the system, electrical energy is tapped from an extra-high-voltage cable 3, designed for 400 kV, for example, stepped down to a high voltage of, for example, 110 kV, and fed into the gas-insulated cable 1 designed for this voltage. The gas-insulated cable 1 has underground cable sections of which, for reasons of clarity, only four cable sections 11, 12, 13, 14 are provided with reference numerals. Two mutually abutting cable sections each, for example the cable sections 11 and 12, are accessible from the outside and can be operationally interconnected. The accessibility from the outside can advantageously be provided at a network junction point or a substation 4 (having an installation point) at which the line voltage of 110 kV carried in the cable sections 13 and 14 is stepped down to a medium voltage of, typically, 10, 20 or 30 kV, but can also be arranged at a point 5 which is accessible to field staff and at which two cable sections, for example the cable sections 11 and 12, are directly interconnected.

Figure 2:
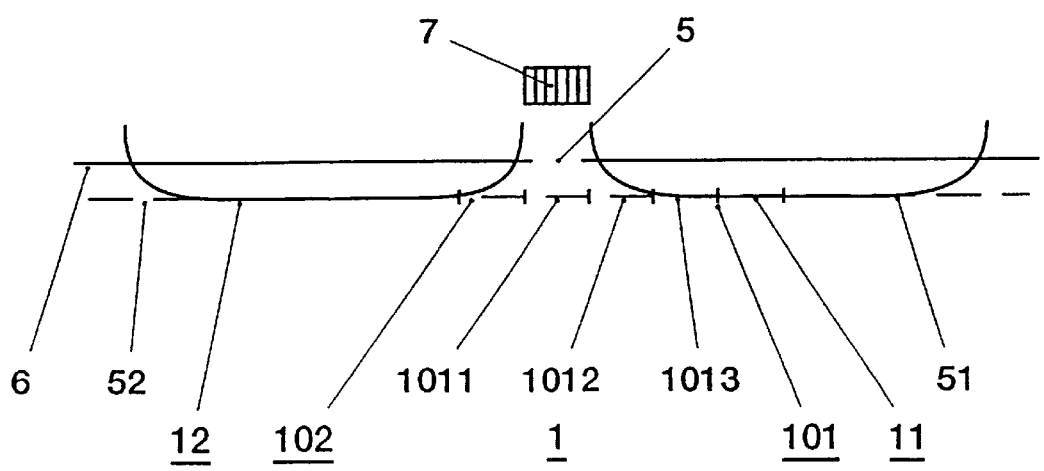
FIG. 2 shows, in a greatly simplified representation, a part of the system in accordance with FIG. 1 which has two sections of the gas-insulated cable and one of the installation points.

An arrangement of the two cable sections 11 and 12 which is typical of the system can be seen in FIG. 2. It can be seen that the cable sections 11, 12 are laid below the surface 6 of the earth and are accessible from the outside at the point 5. Also provided at the point 5 is a device 7 for feeding at least one of the two cable sections 11, 12 with coolant. The cable sections 11, 12, 13, 14 are typically approximately 300 to 500 m long and are generally buried approximately 10 m below the surface 6 of the earth. This reliably prevents any negative influence on the environment, in particular through the leakage of electromagnetic interference fields.

Figure 3:
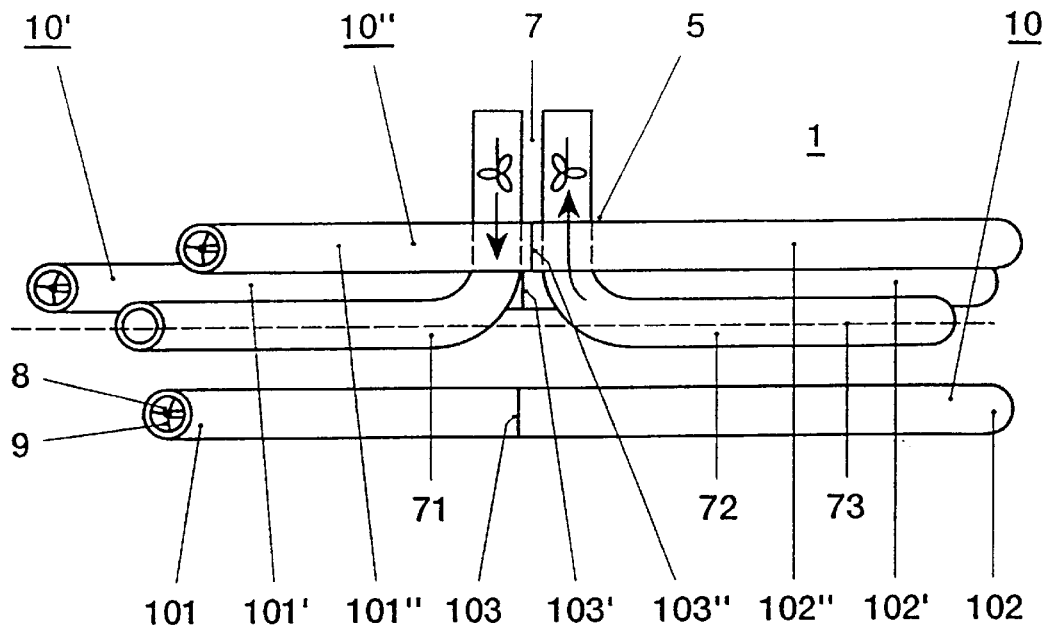
FIG. 3 shows, in a perspective view, a part of a gas-insulated cable, designed with three phases, in the region of the installation point in accordance with FIG. 2, and of a cooling device preferably conducting air or water as coolant.

The gas-insulated cable 1 can be designed with one or more phases or as a double cable. In each case, the cable 1 has an electrical conductor 8, visible from FIG. 3, for example, which is arranged, mounted on insulated supports 9, in a pipeline 10. The pipeline 10 is filled with an insulating gas, such as $SF_6$, for example, at a pressure of up to a few bars, and may be composed of metal such as aluminum or steel, for example, or, as the case may be, conductively coated plastic such as polyethylene, for example. The gas space can be monitored for tightness in a simple way by means of a pressure sensor. As can be seen in FIG. 3, the electrical conductor 8 can be arranged on the axis of the pipeline 10. If the gas-insulated cable 1 is designed—as represented in FIG. 3—with three phases, the electrical conductors assigned to the two other phases are arranged centrally in further pipelines 10' and 10" which are routed parallel to one another and to the pipeline 10. In the case of a multiphase, for example three-phase, system, the phase conductors can also be arranged in a single pipeline while complying with the prescribed insulation spacings. Each pipeline 10 or 10' or 10" is assembled from pipes 101, 102 or 101', 102' or 101", 102" which can be interconnected at the installation point 5. Compartmentalized insulators 103 or 103' or 103" prevent the exchange of gas between mutually abutting pipes 101, 102 or 101', 102' or 101", 102".

The cooling device 7 provided at the installation point has pipes 71 and 72 which serve to accommodate coolant such as, in particular, air or, for example, water and are routed parallel to the pipelines 10, 10' and 10". The pipes 71 and 72 are situated one behind another on a common axis 73 and are arranged at approximately the same distance from the pipelines 10, 10' and 10", which are preferably located at the corners of an equilateral triangle. The pipelines 10, 10', 10" typically have diameters of 30 to 50 cm. Their mutual spacing is generally 20 to 100 cm. The pipes 71 and 72 are designed bent in the region of the installation point 5 and are routed upwards in the vertical direction out of the system after the bend. Coolant, for example air, is blown into the pipe 71 using a conveying means (not marked) and is removed from the pipe at the next installation point by means of a further conveying means. This further conveying means corresponds to the conveying means represented at the upper end of the pipe 72. On its path through the pipe 71, the coolant extracts from the heated earth surrounding the phase conductors heat which is dissipated directly to the environment at the installation point. The only energy required for the cooling function serves merely to operate the conveying means.

The pipelines 10, 10', 10" and the pipes 71 and 72 are dimensioned such that each of the pipelines can also serve to carry the coolant and each of the pipes 71 and 72 can also serve to accommodate one of the current phase conductors. If, for example, one of the phases, for example the phase provided in the pipeline 10, is defective, the pipes 71 and 72 can be joined at the installation point, and an electrical conductor mounted on insulated supports can then be inserted into the pipeline thus formed, forming a nondefective phase in the process. The pipeline 10 assigned to the defective phase is then designed to correspond to the pipes 71 and 72 and then serves to carry the coolant. In addition, it is possible, as the case may be, to route a return conductor parallel to the pipelines 10, 10', 10", and/or it is also possible to provide electrical phase conductors, routed parallel, of a second gas-insulated cable carrying a second multiphase current.

Instead of an open cooling system having air or water as cooling means, it is also possible to use a closed cooling system having the insulating gas provided in the cable sections 11, 12, . . . Embodiments of such cooling systems can be seen in FIGS. 4, 5 and 6. In the case of the said embodiments, the cooling system has at the installation point heat exchangers 74, 75 which are respectively connected via vertical pipe sections (not designated) to pipelines, for example 10 and 10', assigned to the two phase conductors. First conveying means 76 produce circulation of the insulating gas from the heat exchanger 74 through the pipe 101' of the pipeline 10' to a heat exchanger which is arranged at the next installation point (not shown) and corresponds to the heat exchanger 75, and from there through the pipe 101 of the pipeline 10 back to the heat exchanger 74 (cf. the arrows illustrated in FIG. 4). The heat absorbed during circulation through the pipe 101 is removed in the heat exchanger 74, for example by means of blowers 77. In a corresponding way, the heat absorbed during circulation through the pipe 101' is removed in the heat exchanger (not shown) corresponding to the heat exchanger 75.

Figure 4:
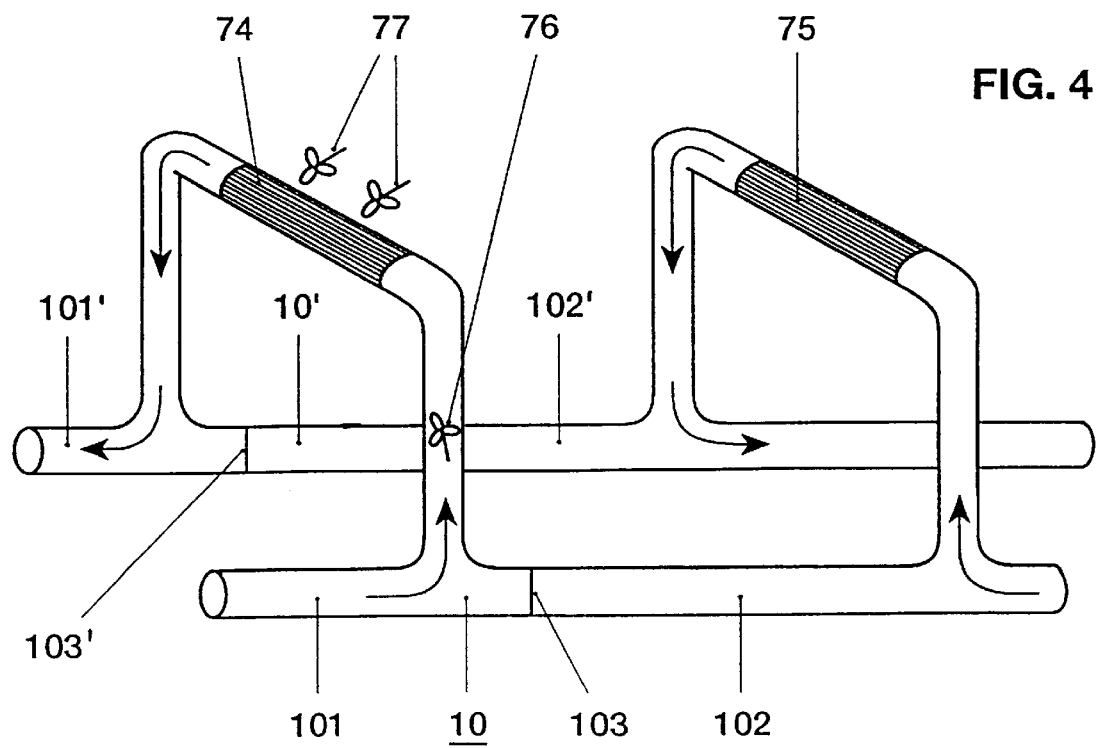
FIG. 4 shows, in a perspective view, a part of a gas-insulated cable, designed with a plurality of phases, in the region of the installation point in accordance with FIG. 2, and of a cooling device which conducts an insulating gas from two phases of the gas-insulated cable as coolant.
Figure 5:
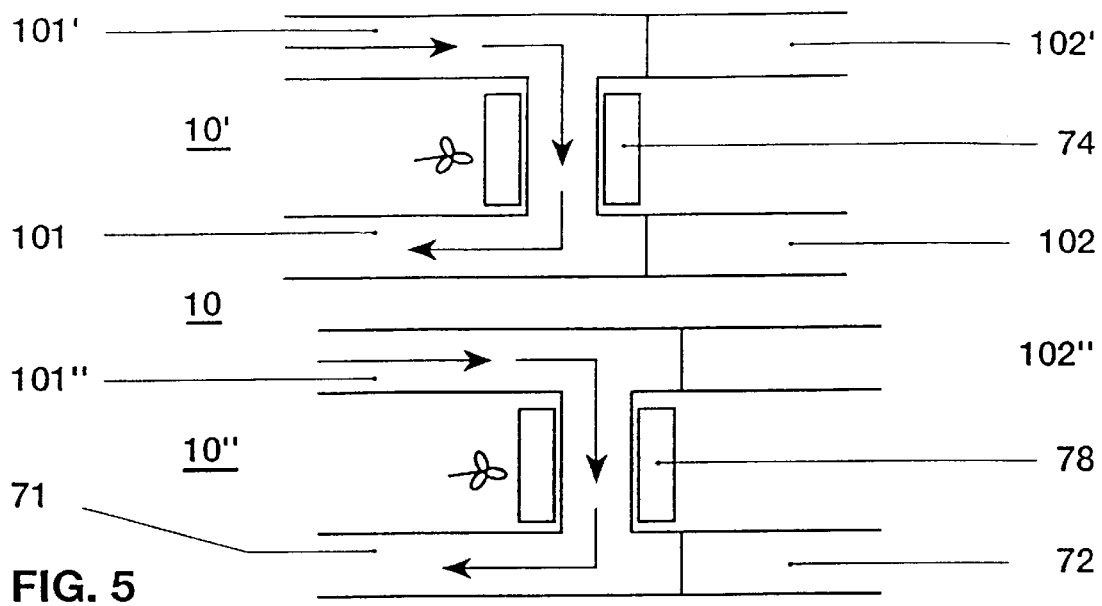
FIG. 5 shows, in a diagrammatic representation, a plan view of a gas-insulated cable, designed with three phases, and an additional pipe in the region of the installation point in accordance with FIG. 2, in which two phases each of the gas-insulated cable or the third phase of the gas-insulated cable and the additional pipe are respectively assigned to a cooling device in accordance with FIG. 4.

In the embodiment of the closed cooling system according to FIG. 5, the pipes 71 and 72 and the pipeline 10", which accommodate a third phase conductor and is assembled from pipes 101" and 102", are further represented in addition as a supplement to FIG. 4. In the case of this cooling device, the pipeline 10" containing the third phase, or the pipe 101" is connected to the pipe 71 via a heat exchanger 78. For the three phases, there is thus a need per cable section, for example 11, for two closed cooling circuits, of which one is routed in the pipes 101 and 101' assigned to two phases, and the other is routed in the pipe 101", assigned to the third phase, and the phase-free pipe 71.

Figure 6:
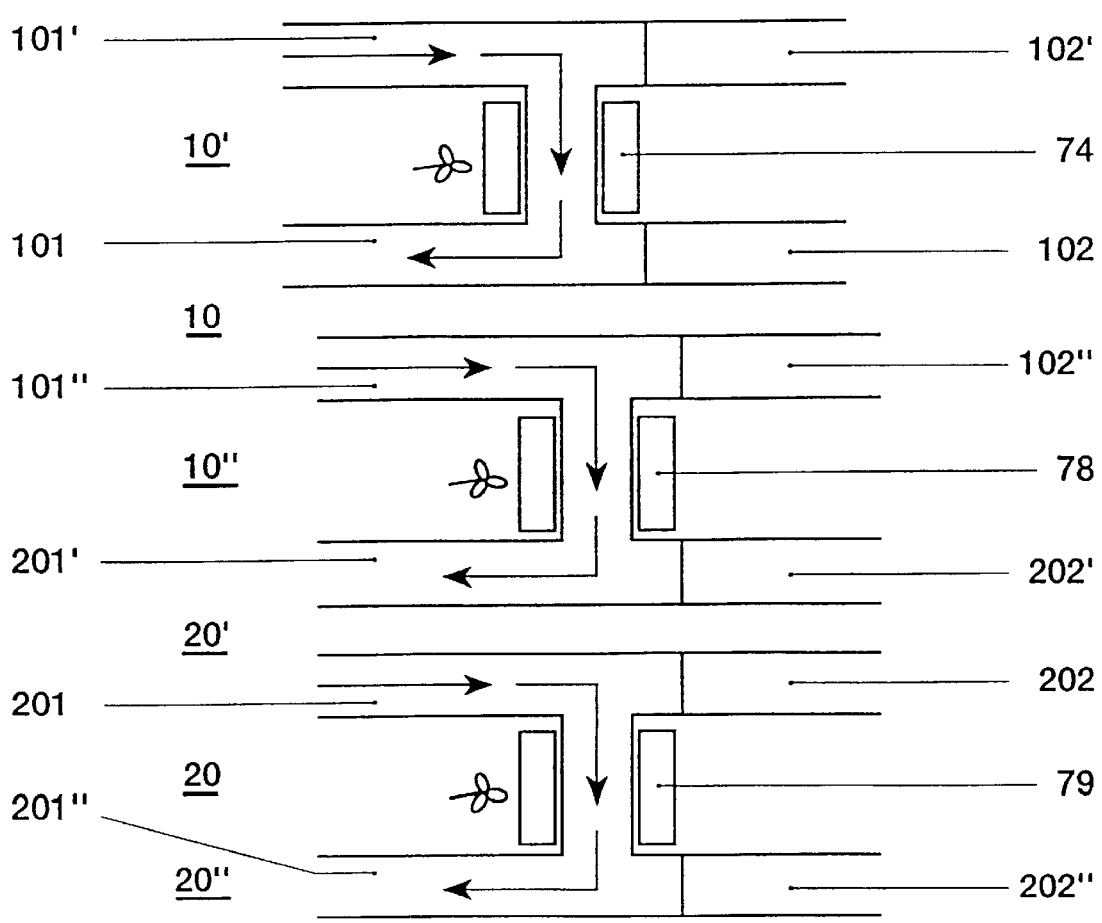
FIG. 6 shows, in a diagrammatic representation, a plan view of two gas-insulated cables, respectively designed with three phases, in the region of the installation point in accordance with FIG. 2, in which two phases each of the two gas-insulated cables are respectively assigned to a cooling device in accordance with FIG. 4.

The embodiment of the closed cooling system according to FIG. 4 which is represented in FIG. 6 is intended for cooling a system according to the invention which is designed as a double cable and respectively has three phase conductors. The three phase conductors of the two cables are arranged in pipelines 10, 10', 10" or 20, 20', 20" with the pipes 101, 102, 101', 102', 101", 102" or 201, 202, 201', 202', 201", 202". In this embodiment, a closed cooling circuit having a heat exchanger 74, 78 or 79 is respectively assigned to two phases. An additional pipe provided for cooling purposes, such as the pipe 71 or 72, can be eliminated.

With reference to FIG. 2, the system according to the invention can be produced in a simple way by drilling at least two predominantly horizontally routed, underground ducts 51, 52 before the production of the operational connection at the installation point 5. At least one of the two cable sections, for example the cable section 11, is produced by gas-tight connection of comparatively short, for example 8–10 m long, pipe sections 1011, 1012, 1013. In this case, for example, the pipe section 1012 and, in a corresponding way, the pipe section 1013 already connected in a gas-tight fashion to this section, are pushed so deep into the duct 51 that all that remains exposed at the installation point 5 is the end of the pipe section 1012 facing the installation point 5. The pipe section 1011 is then connected in a gas-tight way to the initially still exposed end of the pipe section 1012. The pipe thus formed is pushed into the duct 51 until only the end of the pipe section 1011 remains exposed. After the entire pipe 101 of the cable section 11 has been produced in this way, the electrical conductor, which is held by slidably designed insulated supports, is inserted into the laid pipe. Compartmentalized insulators such as, for example, the compartmentalized insulator 103 (FIG. 3) are installed at the ends of the pipe, for example 101, assigned to the cable section, for example 11.

Alternatively, the pipe sections inserted into the prefabricated, underground duct can already accommodate the electrical conductors, held by insulated supports, before gas-tight connection.

In general, the duct 51 or 52 routed underground can be produced by drilling. The pipe sections, for example 1012, can be inserted into the duct 52 by the exertion of pressure. The installation point 5 must be dimensioned sufficient large to be able to guide the pipe sections to the openings of the ducts 51, 52 and to insert them into the ducts.

The ducts 51, 52 need not be routed straight; they can also—as is to be seen in FIG. 2—be of partially bent design. The drilling device can then be positioned on the surface of the earth. In this case, a hole is initially drilled through the surface of the earth and is as a rule initially guided predominantly vertically. The section guided predominantly vertically for at most a few meters is adjoined by a section, extending in a bent fashion, of several meters which finally merges into a section a few hundred meters long which extends predominantly horizontally. This horizontally extending section can be adjoined in turn by a section of bent design and is passed through the surface of the earth at an external installation point 5, or the horizontally extending section can open into an installation point 5 arranged underground, as represented by dashes in FIG. 2.

It is particularly advantageous when use is made, for the purpose of accommodating the pipe, of a duct which is guided underground and is already used for a different purpose, since drilling work is then avoided. It is particularly advantageous if the duct is filled with a shock-absorbing liquid such as, for example, sewage. The sewage supports the tube in a shock absorbing fashion. Seismic forces caused by earthquakes are absorbed by the sewage surrounding the pipe on all sides, with the result that no radial forces are exerted on the pipe. Since the sewage is at earth potential, the pipe holding the electrical conductor is always kept at a defined potential.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for producing a system for transmitting electrical energy via an underground, high-voltage cable, the method comprising the steps of:

selecting an installation point that is accessible from above ground;

selecting a first underground duct and a second underground duct, the first underground duct and the second underground duct extending from the installation point, the first underground duct and the second underground duct each having a predominantly horizontal section;

inserting a first pipe section in the first underground duct;

inserting a second pipe section in the first underground duct;

connecting the second pipe section in a gas-tight way to a still exposed end of the first pipe section, the first pipe section and the second pipe section forming a pipe;

pushing the first pipe section and the second pipe section into the first underground duct until only an end of the second pipe section remains exposed at the installation point;

inserting a first cable section in the first pipe section and the second pipe section;

filling the first pipe section and the section pipe section with an insulating gas; and, operationally interconnecting the first cable section with a second cable section in the second underground duct to form a gas insulated cable.

2. The method as claimed in claim 1, wherein slidably designed insulated supports are used to hold the first cable section when inserting the first cable section into the pipe.

3. The method as claimed in claim 1, wherein the first cable section is inserted in the pipe sections before the pipe sections are inserted into the first underground duct and before the pipe sections are connected.

4. The method as claimed in claim 1, wherein the first underground duct is produced by drilling.

5. The method as claimed in claim 4, the method further comprising the steps of:

drilling from above ground a section of the first underground duct, the section having an at least partially bent section; and, drilling a predominantly horizontal section, the predominantly horizontal section extending from the bent design section.

6. The method as claimed in claim 5, wherein the predominantly horizontally section is connected by the bent design section to the installation point.

7. The method as claimed in claim 4, wherein the drilling is carried out from a position in the installation point that is underground.

8. The method as claimed in claim 1, wherein the first underground duct pre-existed for another purpose.

9. The method as claimed in claim 8, wherein the first underground duct is a sewage pipe filled with a shock-absorbing liquid.

* * * * *